(12) United States Patent
Nakao et al.

(10) Patent No.: US 11,108,273 B2
(45) Date of Patent: Aug. 31, 2021

(54) CONTACTLESS POWER TRANSMISSION APPARATUS WITH STABLE BIDIRECTIONAL POWER TRANSMISSION

(71) Applicant: OMRON Corporation, Kyoto (JP)

(72) Inventors: Goro Nakao, Inazawa (JP); Atsushi Nomura, Ichinomiya (JP); Yusuke Kawai, Ichinomiya (JP); Toshiyuki Zaitsu, Yokohama (JP)

(73) Assignee: OMRON Corporation, Kyolo (JP)

( * ) Notice: Subject to any disclaimer, the term of this patent is extended or adjusted under 35 U.S.C. 154(b) by 0 days.

(21) Appl. No.: 16/971,709

(22) PCT Filed: Jan. 18, 2019

(86) PCT No.: PCT/JP2019/001537
§ 371 (c)(1),
(2) Date: Aug. 21, 2020

(87) PCT Pub. No.: WO2019/171784
PCT Pub. Date: Sep. 12, 2019

(65) Prior Publication Data
US 2021/0119485 A1    Apr. 22, 2021

(30) Foreign Application Priority Data

Mar. 5, 2018 (JP) .............................. JP2018-038546

(51) Int. Cl.
*H02J 50/12* (2016.01)
(52) U.S. Cl.
CPC .................................... *H02J 50/12* (2016.02)
(58) Field of Classification Search
CPC .................................. H02J 50/12; H02J 50/00
See application file for complete search history.

(56) References Cited

U.S. PATENT DOCUMENTS

| 9,959,972 | B2* | 5/2018 | Lestoquoy | H02J 50/12 |
| 2015/0001958 | A1* | 1/2015 | Abe | B60L 15/007 |
| | | | | 307/104 |

(Continued)

FOREIGN PATENT DOCUMENTS

| JP | 2015-42051 A | 3/2015 |
| JP | 2016-12970 A | 1/2016 |

(Continued)

OTHER PUBLICATIONS

Watanabe et al, "Bidirectional contactless power transfer system expandable from unidirectional systems", IEEJ Transactions D, IEEJ Transactions on Industry Applications, 2013, pp. 707-713, vol. 133, No. 7, Concise explanation of relevance provided in the specification.

(Continued)

*Primary Examiner* — Hal Kaplan
*Assistant Examiner* — Joseph N Inge
(74) *Attorney, Agent, or Firm* — Metrolex IP Law Group, PLLC

(57) ABSTRACT

A contactless power transmission apparatus includes a secondary device that includes a resonant circuit including a second transmitter coil that transmits and receives electric power to and from a first transmitter coil included in a primary device and a resonant capacitor connected in parallel to the second transmitter coil, a second converter circuit connected to the resonant circuit to convert alternating current power flowing through the resonant circuit to direct current power and convert direct current power to alternating current power flowing through the resonant circuit, a coil connected in series to the second transmitter coil between the resonant circuit and the second converter circuit, and a capacitor connected in series to the second transmitter coil (Continued)

between the second transmitter coil and the second converter circuit.

1 Claim, 4 Drawing Sheets

(56) References Cited

U.S. PATENT DOCUMENTS

| | | | |
|---|---|---|---|
| 2015/0015197 A1* | 1/2015 | Mi | B60L 53/122 |
| | | | 320/108 |
| 2015/0061402 A1* | 3/2015 | Ichikawa | H02J 50/70 |
| | | | 307/104 |
| 2015/0326031 A1* | 11/2015 | Yamaguchi | H02J 50/10 |
| | | | 307/104 |
| 2016/0172984 A1 | 6/2016 | Takagi et al. | |
| 2017/0063161 A1* | 3/2017 | Sugiyama | H02J 7/025 |
| 2017/0129347 A1* | 5/2017 | Kotani | H02J 50/40 |

FOREIGN PATENT DOCUMENTS

| | | |
|---|---|---|
| JP | 2016-111898 A | 6/2016 |
| WO | 2013/118274 A1 | 8/2013 |
| WO | 2017/104304 A1 | 6/2017 |

OTHER PUBLICATIONS

An English translation of the International Search Report ("ISR") of PCT/JP2019/001537 dated Mar. 26, 2019.
The Written Opinion("WO") of PCT/JP2019/001537 dated Mar. 26, 2019.

\* cited by examiner

CONTACTLESS POWER TRANSMISSION APPARATUS WITH STABLE BIDIRECTIONAL POWER TRANSMISSION

FIELD

The present invention relates to a contactless power transmission apparatus.

BACKGROUND

Techniques have been studied for contactless power transmission (also called as wireless power transmission) or transmitting electric power through space without using metal contacts or other connections.

A known contactless power transmission technique is to transmit power by electromagnetic induction. A technique for supplying power by electromagnetic induction may use primary series-secondary parallel capacitors (hereafter, SP topology) (refer to, for example, Non-Patent Literature 1). With an SP topology, a capacitor is connected in series to a coil serving as a part of a transformer on the primary end (transmitter end) and another capacitor is connected in parallel to a coil serving as another part of the transformer on the secondary end (receiver end).

With the SP topology, a resonant circuit including the coil and the capacitor on the receiver end causes parallel resonance and outputs a constant current. Thus, the control using the SP topology is typically more difficult than that using primary series-secondary series capacitors (hereafter, SS topology) having a constant voltage output at the receiver end, because electronic devices are typically controlled with a constant voltage.

With the SP topology, a reactor may be connected in series to the coil of the resonant circuit on the receiver end to reduce harmonic components (refer to, for example, Patent Literature 1). This may be called an SPL topology, and is thus herein referred to as the SPL topology.

Using the SPL topology, techniques have been developed for enabling bidirectional power supply (refer to, for example, Non-Patent Literature 1).

CITATION LIST

Patent Literature

Patent Literature 1: Japanese Unexamined Patent Application Publication No. 2015-42051

Non-Patent Literature

Non-Patent Literature 1: Watanabe et al., "Bidirectional contactless power transfer system expandable from unidirectional systems", IEEJ Transactions D, IEEJ Transactions on Industry Applications, Vol. 133, No. 7, pp. 707-713, 2013

SUMMARY

Technical Problem

A contactless power transmission apparatus for bidirectional power supply is to stably transmit power in both directions.

One or more aspects of the present invention are directed to a contactless power transmission apparatus that stably transmits power in both directions.

Solution to Problem

A contactless power transmission apparatus according to one aspect of the present invention includes a primary device and a secondary device that transmits and receives electric power to and from the primary device. The primary device includes a first transmitter coil that transmits and receives electric power to and from the secondary device, a capacitor connected in series to the first transmitter coil, and a first converter circuit connected to the first transmitter coil through the capacitor to convert direct current power to alternating current power flowing through the first transmitter coil and convert alternating current power flowing through the first transmitter coil to direct current power. The secondary device includes a resonant circuit including a second transmitter coil that transmits and receives electric power to and from the primary device and a resonant capacitor connected in parallel to the second transmitter coil, a second converter circuit connected to the resonant circuit to convert alternating current power flowing through the resonant circuit to direct current power and convert direct current power to alternating current power flowing through the resonant circuit, a coil connected in series to the second transmitter coil between the resonant circuit and the second converter circuit, and a capacitor connected in series to the second transmitter coil between the second transmitter coil and the second converter circuit.

The contactless power transmission apparatus with this structure can stably transmit power in both directions.

In the contactless power transmission apparatus, the capacitor connected in series to the second transmitter coil may have a capacitance at least ten times larger than a capacitance of the resonant capacitor.

The contactless power transmission apparatus thus reduces biased excitation during power transmission from the secondary device to the primary device without reducing resonance in the resonant circuit during power transmission from the primary device to the secondary device.

DETAILED DESCRIPTION

A contactless power transmission apparatus according to one embodiment of the present invention will now be described with reference to the drawings. The contactless power transmission apparatus with the same configuration as the SPL topology enables bidirectional power transmission.

The inventors of the present application have noticed that a switching element such as a metal-oxide-semiconductor field-effect transistor (MOSFET) in a contactless power transmission apparatus using the SPL topology can break due to an overcurrent through a circuit on a secondary end (power supply end in this case), which results from biased excitation occurring when power is transmitted from the secondary end to a primary end.

The contactless power transmission apparatus thus includes a capacitor connected in series to a transmitter coil as a direct current (DC) breaker in a secondary-end device, in which a coil for power transmission (hereafter, a transmitter coil) and a resonant capacitor resonate in parallel, and another coil is connected in series to the transmitter coil. The contactless power transmission apparatus can prevent biased excitation and stably transmit power in both directions when power is transmitted from the secondary end to the primary end.

Figure 1:
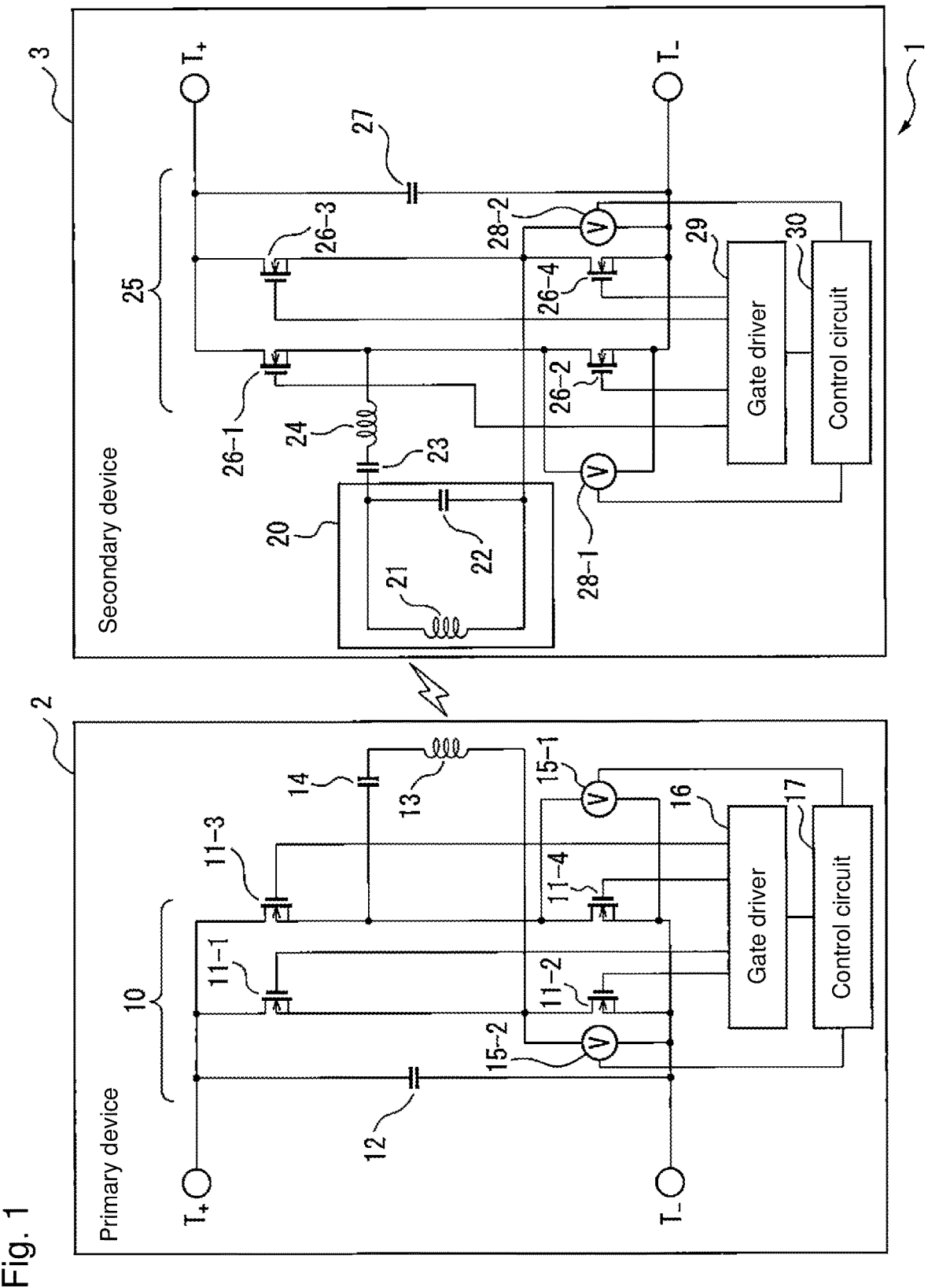
FIG. 1 is a schematic diagram of a contactless power transmission apparatus according to one embodiment of the present invention.

FIG. 1 is a schematic diagram of a contactless power transmission apparatus according to one embodiment of the present invention. As shown in FIG. 1, a contactless power transmission apparatus 1 includes a primary device 2 and a secondary device 3 for transmitting power through space from or to the primary device 2 in a contactless manner. The primary device 2 includes a power supply rectifier circuit 10, a transmitter coil 13, a capacitor 14, two voltage detection circuits 15-1 and 15-2, a gate driver 16, and a control circuit 17. The secondary device 3 includes a resonant circuit 20 including a transmitter coil 21 and a resonant capacitor 22, a capacitor 23, a coil 24, a power supply rectifier circuit 25, two voltage detection circuits 28-1 and 28-2, a gate driver 29, and a control circuit 30.

The primary device 2 will now be described.

The power supply rectifier circuit 10 is an example of a first converter circuit. During power transmission from the primary device 2 to the secondary device 3, the power supply rectifier circuit 10 is connected to a power source that supplies direct current (DC) power, converts DC power supplied from the power source into alternating current (AC) power, and then supplies the AC power to the transmitter coil 13. In this case, the power supply rectifier circuit 10 has its positive input-output terminal T+ connected to the positive electrode of the power source, and its negative input-output terminal T− connected to the negative electrode of the power source. During power transmission from the secondary device 3 to the primary device 2, the power supply rectifier circuit 10 is connected to a load circuit or a battery, rectifies AC power received through the transmitter coil 13, and then supplies the power to the load circuit or the battery. In this case as well, the power supply rectifier circuit 10 has its positive input-output terminal T+ connected to the positive electrode of the load circuit or the battery, and its negative input-output terminal T− connected to the negative electrode of the load circuit or the battery.

The power supply rectifier circuit 10 includes four switching elements 11-1 to 11-4 and a smoothing capacitor 12. The four switching elements 11-1 to 11-4 form a full-bridge circuit. The switching elements 11-1 to 11-4 are, for example, n-channel MOSFETs. Of the switching elements 11-1 to 11-4, the switching elements 11-1 and 11-2 are connected in series between the positive input-output terminal T+ and the negative input-output terminal T− of the power supply rectifier circuit 10. In the present embodiment, the switching element 11-1 has its drain terminal connected to the positive input-output terminal T+ and its source terminal connected to the drain terminal of the switching element 11-2. The switching element 11-2 has its source terminal connected to the negative input-output terminal T−. The source terminal of the switching element 11-1 and the drain terminal of the switching element 11-2 are connected to one end of the transmitter coil 13.

Of the switching elements 11-1 to 11-4, similarly, the switching elements 11-3 and 11-4 are connected in parallel to the switching elements 11-1 and 11-2 and in series to each other between the positive input-output terminal T+ and the negative input-output terminal T−. The switching element 11-3 has its drain terminal connected to the positive input-output terminal T+ and its source terminal connected to the drain terminal of the switching element 11-4. The switching element 11-4 has its source terminal connected to the negative input-output terminal T−. The source terminal of the switching element 11-3 and the drain terminal of the switching element 11-4 are connected to the other end of the transmitter coil 13 through the capacitor 14.

The switching elements 11-1 to 11-4 have their gate terminals connected to the gate driver 16. Each of the switching elements 11-1 to 11-4 may have its gate terminal connected to its source terminal through a resistor to be reliably turned on in response to a voltage for turning on the switching element. The switching elements 11-1 to 11-4 are each turned on and off in response to a voltage applied by the gate driver 16 in accordance with a control signal from the control circuit 17 at an adjustable switching frequency.

A pair of the switching elements 11-1 and 11-4 and a pair of the switching elements 11-2 and 11-3 are alternately turned on and off during power transmission from the primary device 2 to the secondary device 3. In this case, the switching elements 11-2 and 11-3 are turned off while the switching elements 11-1 and 11-4 are turned on. Conversely, the switching elements 11-1 and 11-4 are turned off while the switching elements 11-2 and 11-3 are turned on. This allows DC power supplied from a power source to be converted into AC power with the switching frequency of the switching elements and supplied to the transmitter coil 13.

The pair of the switching elements 11-1 and 11-4 and the pair of the switching elements 11-2 and 11-3 are alternately turned on and off also during power transmission from the secondary device 3 to the primary device 2. In this case as well, the switching elements 11-2 and 11-3 are turned off while the switching elements 11-1 and 11-4 are turned on. Conversely, the switching elements 11-1 and 11-4 are turned off while the switching elements 11-2 and 11-3 are turned on. In this case, to enable synchronous rectification, the pair of the switching elements 11-2 and 11-3 are turned on when the potential at the one end of the transmitter coil 13 connected to the switching elements 11-3 and 11-4 is higher than the potential at the other end of the transmitter coil 13 connected to the switching elements 11-1 and 11-2, and conditions described below are satisfied. The pair of the switching elements 11-1 and 11-4 are turned on when the potential at the one end of the transmitter coil 13 connected to the switching elements 11-3 and 11-4 is lower than the potential at the other end of the transmitter coil 13 connected to the switching elements 11-1 and 11-2, and conditions described below are satisfied.

The smoothing capacitor 12 is connected in parallel to the switching elements 11-1 and 11-2 and between the positive input-output terminal T+ and the negative input-output terminal T−. The smoothing capacitor 12 is located closer to the positive input-output terminal T+ and the negative input-output terminal T− than the switching elements 11-1 to 11-4. During power transmission from the secondary device 3 to the primary device 2, the smoothing capacitor 12 smooths power received through the transmitter coil 13 and rectified by the switching elements 11-1 to 11-4. The smoothed DC power is output to a load circuit or another device connected to the positive input-output terminal T+ and the negative input-output terminal T−.

During power transmission from the primary device 2 to the secondary device 3, the transmitter coil 13 transmits, through space, power supplied from a power source and converted into AC power by the power supply rectifier circuit 10 to the resonant circuit 20 in the secondary device 3. During power transmission from the secondary device 3 to the primary device 2, the transmitter coil 13 receives power from the resonant circuit 20 in the secondary device 3 through space and outputs the received power to the power supply rectifier circuit 10.

The capacitor 14 is connected in series to the transmitter coil 13 between the transmitter coil 13 and the power supply rectifier circuit 10. During power transmission from the primary device 2 to the secondary device 3, the capacitor 14 repeatedly charges and discharges in response to each of the switching elements 11-1 to 11-4 turned on and off at the switching frequency and supplies AC power with the switching frequency to the transmitter coil 13.

During power transmission from the secondary device 3 to the primary device 2, the capacitor 14 resonates in series together with the transmitter coil 13 to allow the transmitter coil 13 to receive power transmitted from the secondary device 3.

The voltage detection circuit 15-1 measures the voltage between the source and the drain of the switching element 11-4 and outputs the measurement value to the control circuit 17. Similarly, the voltage detection circuit 15-2 measures the voltage between the source and the drain of the switching element 11-2 and outputs the measurement value to the control circuit 17. The voltage detection circuits 15-1 and 15-2 may each be any circuit that can obtain the measurement value of the voltage between the source and the drain of their corresponding switching elements.

The gate driver 16 receives a control signal, from the control circuit 17, for turning on and off each of the switching elements 11-1 to 11-4, and changes a voltage applied to the gate terminals of the switching elements 11-1 to 11-4 in response to the control signal. More specifically, when receiving a control signal for turning on the switching element 11-1, the gate driver 16 applies a relatively high voltage for turning on the switching element 11-1 to the gate terminal of the switching element 11-1. When receiving a control signal for turning off the switching element 11-1, the gate driver 16 applies a relatively low voltage for turning off the switching element 11-1 to the gate terminal of the switching element 11-1. This allows the gate driver 16 to turn on and off the switching element 11-1 at timing specified by the control circuit 17. Similarly, the gate driver 16 turns on and off each of the switching elements 11-2 to 11-4 by changing a voltage applied to the gate terminal of the switching element.

The control circuit 17 includes, for example, nonvolatile and volatile memory circuits, an arithmetic circuit, and an interface circuit for connection to another circuit. The control circuit 17 receives a signal from an external device (not shown) for transmitting power either from the primary device 2 to the secondary device 3 or from the secondary device 3 to the primary device 2. The control circuit 17 controls the power supply rectifier circuit 10 in accordance with the signal. More specifically, during power transmission from the primary device 2 to the secondary device 3, the control circuit 17 controls the on-off state of each switching element in the power supply rectifier circuit 10 to supply AC power from the power supply rectifier circuit 10 to the transmitter coil 13 at a predetermined switching frequency.

The frequency response of the power transmission efficiency between the primary device 2 and the secondary device 3 varies depending on the degree of coupling between the transmitter coil 13 in the primary device 2 and the transmitter coil 21 in the secondary device 3. Thus, when the degree of coupling between the transmitter coil 13 and the transmitter coil 21 is substantially constant during power transmission, such as when the relative positions of the primary device 2 and the secondary device 3 are prefixed during power transmission, the control circuit 17 may output, to the gate driver 16, a control signal for alternately turning on and off the pair of the switching elements 11-1 and 11-4 and the pair of the switching elements 11-2 and 11-3 at a switching frequency at which the power transmission efficiency peaks at the degree of coupling. The control circuit 17 may include, for example, an oscillating circuit and a frequency divider to output a control signal to the gate driver 16 at intervals in accordance with the switching frequency.

During power transmission from the secondary device 3 to the primary device 2, the control circuit 17 controls the on-off state of each switching element in the power supply rectifier circuit 10 to synchronously rectify AC power received through the transmitter coil 13. The control circuit 17, for example, may control the on-off state of the switching elements 11-1 to 11-4 in a manner similar to synchronous rectification at a secondary end of an LLC resonant converter. For example, the voltage between the source and the drain of the switching element 11-4 detected by the voltage detection circuit 15-1 decreases to less than or equal to a predetermined reference value when a current starts flowing through a body diode in the switching element 11-4. This causes the control circuit 17 to output, to the gate driver 16, a control signal for turning on the switching elements 11-1 and 11-4. In response to the control signal, the gate driver 16 turns on the switching elements 11-1 and 11-4. When the voltage detected by the voltage detection circuit 15-1 between the source and the drain of the switching element 11-4 exceeds the predetermined reference value, the control circuit 17 outputs, to the gate driver 16, a control signal for turning off the switching elements 11-1 and 11-4. In response to the control signal, the gate driver 16 turns off the switching elements 11-1 and 11-4. Similarly, the voltage detected by the voltage detection circuit 15-2 between the source and the drain of the switching element 11-2 decreases to less than or equal to a predetermined reference value when a current starts flowing through a body diode in the switching element 11-2. This causes the control circuit 17 to output, to the gate driver 16, a control signal for turning on the switching elements 11-2 and 11-3. In response to the control signal, the gate driver 16 turns on the switching elements 11-2 and 11-3. When the voltage detected by the voltage detection circuit 15-2 between the source and the drain of the switching element 11-2 exceeds the predetermined reference value, the control circuit 17 outputs, to the gate driver 16, a control signal for turning off the switching elements 11-2 and 11-3. In response to the control signal, the gate driver 16 turns off the switching elements 11-2 and 11-3. This allows the power supply rectifier circuit 10 to perform synchronous rectification and reduce loss due to a current flowing through the power supply rectifier circuit 10.

The secondary device 3 will now be described.

The resonant circuit 20 is an LC resonant circuit including the transmitter coil 21 and the resonant capacitor 22 connected in parallel to each other. The transmitter coil 21 in the resonant circuit 20 has one end connected to one end of the resonant capacitor 22 and to the power supply rectifier circuit 25 through the capacitor 23 and the coil 24. The transmitter coil 21 has the other end connected to the other end of the resonant capacitor 22 and the power supply rectifier circuit 25.

During power transmission from the primary device 2 to the secondary device 3, the transmitter coil 21, for example, resonates with AC flowing through the transmitter coil 13 in the primary device 2 and receives power from the transmitter coil 13. The transmitter coil 21 outputs the received power to the power supply rectifier circuit 25 through the resonant capacitor 22, the capacitor 23, and the coil 24. During power transmission from the secondary device 3 to the primary device 2, the transmitter coil 21 transmits, through space, power supplied from a DC power source connected to the power supply rectifier circuit 25 and converted into AC power by the power supply rectifier circuit 25 to the transmitter coil 13 in the primary device 2.

The transmitter coil 21 and the transmitter coil 13 in the primary device 2 may have the same number or different numbers of turns.

The resonant capacitor 22 has one end connected to one end of the transmitter coil 21 and the capacitor 23 and the other end connected to the other end of the transmitter coil 21 and the power supply rectifier circuit 25. During power transmission from the primary device 2 to the secondary device 3, the resonant capacitor 22 outputs power received in the transmitter coil 21 to the power supply rectifier circuit 25 through the capacitor 23 and the coil 24. During power transmission from the secondary device 3 to the primary device 2, the resonant capacitor 22 resonates with the resonant circuit including the transmitter coil 13 and the capacitor 14 in the primary device 2 together with the transmitter coil 21 and transmits power supplied from a power source and converted into AC power by the power supply rectifier circuit 25 to the transmitter coil 13.

The capacitor 23 is connected in series to the transmitter coil 21 between the transmitter coil 21 and the coil 24. During power transmission from the primary device 2 to the secondary device 3, the capacitor 23 repeatedly charges and discharges with the received AC power and outputs the received power to the power supply rectifier circuit 25 through the coil 24.

During power transmission from the secondary device 3 to the primary device 2, the capacitor 23 repeatedly charges and discharges with AC power supplied from the power supply rectifier circuit 25 and transmits the supplied AC power to the resonant circuit 20 while reducing the likelihood of biased excitation.

In the power supply rectifier circuit 25, transmitting power from the secondary device 3 to the primary device 2 can cause biased excitation when, for example, the potential at the one end of the transmitter coil 21 is higher than the potential at the other end of the transmitter coil 21 in a period different from a period in which the potential is lower at the one end than at the other end, or when the power supply rectifier circuit 25 has a resistance to a current flowing from the one end to the other end of the transmitter coil 21 different from a resistance to a current flowing in the reverse direction. This results from a difference between the amount of excitation current flowing from the one end to the other end and the amount of excitation current flowing in the reverse direction through the transmitter coil 21.

Figure 2A:
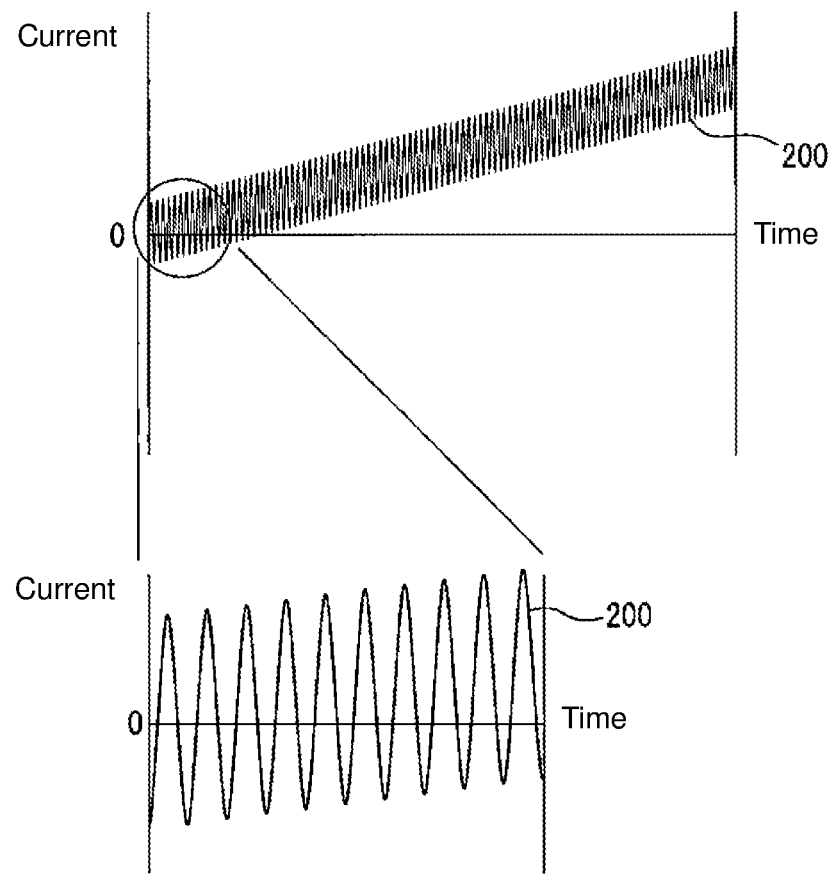
FIG. 2A is a graph showing temporal changes in a current flowing through a secondary-end transmitter coil under biased excitation in a contactless power transmission apparatus using the SPL topology.

FIG. 2A is a graph showing, as a reference example, temporal changes in a current flowing through a secondary-end transmitter coil under biased excitation in a contactless power transmission apparatus using the SPL topology. In FIG. 2A, the horizontal axis indicates time and the vertical axis indicates amperage. A graph 200 represents temporal changes in the current flowing through the secondary-end transmitter coil. As indicated by the graph 200, the current flowing through the transmitter coil gradually increases with time when biased excitation occurs. As the current continues to increase, the current may break, for example, switching elements included in the secondary-end device.

However, in the present embodiment, the capacitor 23 connected in series to the transmitter coil 21 provides negative feedback in response to variations in the excitation current, and reduces the likelihood of biased excitation. More specifically, when a larger excitation current flows from the capacitor 23 toward the transmitter coil 21 than an excitation current flowing in the reverse direction, the power charged in the capacitor 23 as well as the voltage across the capacitor 23 increases. This decreases the voltage across the transmitter coil 21 and thus decreases the excitation current flowing from the capacitor 23 toward the transmitter coil 21, and reduces the likelihood of biased excitation. Similarly, when a smaller excitation current flows from the capacitor 23 toward the transmitter coil 21 than an excitation current flowing in the reverse direction, the capacitor 23 causes a smaller excitation current to flow from the transmitter coil 21 toward the capacitor 23, and reduces the likelihood of biased excitation.

Figure 2B:
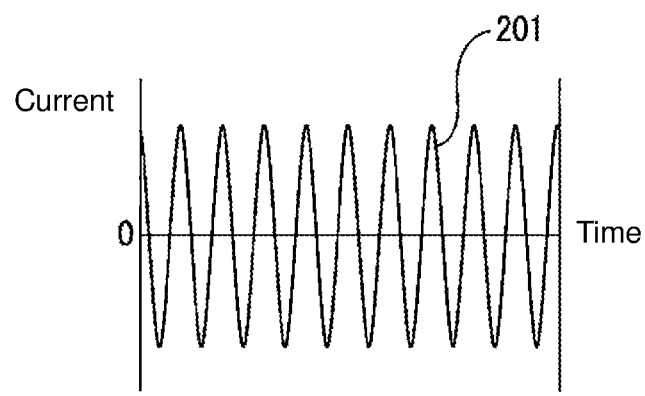
FIG. 2B is a graph showing temporal changes in a current flowing through a transmitter coil in a secondary device in the contactless power transmission apparatus according to the embodiment during power transmission from the secondary device to a primary device.

FIG. 2B is a graph showing temporal changes in a current flowing through the transmitter coil 21 in the contactless power transmission apparatus 1 according to the present embodiment during power transmission from the secondary device 3 to the primary device 2. In FIG. 2B, the horizontal axis indicates time and the vertical axis indicates amperage. A graph 201 represents temporal changes in the current flowing through the transmitter coil 21. As indicated by the graph 201, the current flowing through the transmitter coil 21 simply cyclically increases and decreases at a switching frequency and has a constant average value over time, thus reducing the likelihood of biased excitation.

The capacitor 23 may have a capacitance of at least substantially ten times the capacitance of the resonant capacitor 22. This allows the capacitor 23 to reduce the likelihood of biased excitation during power transmission from the secondary device 3 to the primary device 2 without reducing resonance in the resonant circuit 20 during power transmission from the primary device 2 to the secondary device 3.

The coil 24 is connected between the resonant circuit 20 and the power supply rectifier circuit 25. In the present embodiment, the coil 24 has one end connected to the capacitor 23 included in the resonant circuit 20 to be connected in series to the capacitor 23 and the transmitter coil 21, and the other end connected to the power supply rectifier circuit 25. During power transmission from the primary device 2 to the secondary device 3, the coil 24 outputs power received by the resonant circuit 20 to the power supply rectifier circuit 25. The coil 24 reduces harmonic components included in the received power. During power transmission from the secondary device 3 to the primary device 2, the coil 24 transmits power supplied from the power supply rectifier circuit 25 to the resonant circuit 20. The transmitter coil 21 and the coil 24 may have the same number or different numbers of turns.

The power supply rectifier circuit 25 is an example of a second converter circuit. During power transmission from the primary device 2 to the secondary device 3, the power supply rectifier circuit 25 is connected to a load circuit or a battery, rectifies AC power received through the resonant circuit 20, and then supplies the power to the load circuit or the battery. In this case, the power supply rectifier circuit 25 has its positive input-output terminal T+ connected to the positive electrode of the load circuit or the battery, and its negative input-output terminal T− connected to the negative electrode of the battery. During power transmission from the secondary device 3 to the primary device 2, the power supply rectifier circuit 25 is connected to a power source that supplies DC power, converts DC power supplied from the power source into AC power, and then supplies the AC power to the resonant circuit 20. In this case as well, the power supply rectifier circuit 25 has its positive input-output terminal T+ connected to the positive electrode of the power source, and its negative input-output terminal T− connected to the negative electrode of the power source.

The power supply rectifier circuit 25 is an example of a rectifier circuit and has the same structure as the power supply rectifier circuit 10 included in the primary device 2. More specifically, the power supply rectifier circuit 25 includes four switching elements 26-1 to 26-4 and a smoothing capacitor 27. The four switching elements 26-1 to 26-4 form a full-bridge circuit.

Of the switching elements 26-1 to 26-4, the switching elements 26-1 and 26-2 are connected in series between the positive input-output terminal T+ and the negative input-output terminal T− of the power supply rectifier circuit 25. In the present embodiment, the switching element 26-1 has its drain terminal connected to the positive input-output terminal T+ and its source terminal connected to the drain terminal of the switching element 26-2. The switching element 26-2 has its source terminal connected to the negative input-output terminal T−. The source terminal of the switching element 26-1 and the drain terminal of the switching element 26-2 are connected to one end of the resonant circuit 20 through the coil 24 and the capacitor 23.

Of the switching elements 26-1 to 26-4, similarly, the switching elements 26-3 and 26-4 are connected in parallel to the switching elements 26-1 and 26-2 and in series to each other between the positive input-output terminal T+ and the negative input-output terminal T−. The switching element 26-3 has its drain terminal connected to the positive input-output terminal T+ and its source terminal connected to the drain terminal of the switching element 26-4. The switching element 26-4 has its source terminal connected to the negative input-output terminal T−. The source terminal of the switching element 26-3 and the drain terminal of the switching element 26-4 are connected to the other end of the resonant circuit 20.

The switching elements 26-1 to 26-4 have their gate terminals connected to the gate driver 29. Each of the switching elements 26-1 to 26-4 may have its gate terminal connected to its source terminal through a resistor to be reliably turned on in response to a voltage for turning on the switching element. The switching elements 26-1 to 26-4 are each turned on and off in response to a voltage applied by the gate driver 29 in accordance with a control signal from the control circuit 30 at an adjustable switching frequency.

A pair of the switching elements 26-1 and 26-4 and a pair of the switching elements 26-2 and 26-3 are alternately turned on and off during power transmission from the primary device 2 to the secondary device 3. In this case, the switching elements 26-2 and 26-3 are turned off while the switching elements 26-1 and 26-4 are turned on. Conversely, the switching elements 26-1 and 26-4 are turned off while the switching elements 26-2 and 26-3 are turned on. To enable synchronous rectification, the pair of switching elements 26-1 and 26-4 are turned on when the potential at the one end of the resonant circuit 20 connected to the switching elements 26-1 and 26-2 is higher than the potential at the other end of the resonant circuit 20 connected to the switching elements 26-3 and 26-4, and conditions described below are satisfied. The pair of switching elements 26-2 and 26-3 are turned on when the potential at the one end of the resonant circuit 20 connected to the switching elements 26-1 and 26-2 is lower than the potential at the other end of the resonant circuit 20 connected to the switching elements 26-3 and 26-4, and conditions described below are satisfied. This structure enables rectification of power transmitted from the primary device 2 to the secondary device 3 and received through the resonant circuit 20.

The pair of the switching elements 26-1 and 26-4 and the pair of the switching elements 26-2 and 26-3 are alternately turned on and off also during power transmission from the secondary device 3 to the primary device 2. In this case as well, the switching elements 26-2 and 26-3 are turned off while the switching elements 26-1 and 26-4 are turned on. Conversely, the switching elements 26-1 and 26-4 are turned off while the switching elements 26-2 and 26-3 are turned on. This allows DC power supplied from a power source to be converted into AC power with the switching frequency of the switching elements and supplied to the resonant circuit 20.

The smoothing capacitor 27 is connected in parallel to the switching elements 26-1 and 26-2 and between the positive input-output terminal T+ and the negative input-output terminal T−. The smoothing capacitor 27 is located closer to the positive input-output terminal T+ and the negative input-output terminal T− than the switching elements 20-1 to 26-4. During power transmission from the primary device 2 to the secondary device 3, the smoothing capacitor 27 smooths power received through the resonant circuit 20 and rectified by the switching elements 26-1 to 26-4. The smoothed DC power is output to a load circuit or another device connected to the positive input-output terminal T+ and the negative input-output terminal T−.

The voltage detection circuit 28-1 measures the voltage between the source and the drain of the switching element 26-4 and outputs the measurement value to the control circuit 30. Similarly, the voltage detection circuit 28-2 measures the voltage between the source and the drain of the switching element 26-2 and outputs the measurement value to the control circuit 30. The voltage detection circuits 28-1 and 28-2 may each be any circuit that obtains a measurement value of a voltage between the source and the drain of their corresponding switching elements.

The gate driver 29 receives a control signal, from the control circuit 30, turning on and off each of the switching elements 26-1 to 26-4. In response to the control signal, the gate driver 29 changes a voltage applied to the gate terminal of each of the switching elements 26-1 to 26-4. More specifically, when receiving a control signal for turning on the switching element 26-1, the gate driver 29 applies a relatively high voltage for turning on the switching element 26-1 to the gate terminal of the switching element 26-1. When receiving a control signal for turning off the switching element 26-1, the gate driver 29 applies a relatively low voltage for turning off the switching element 26-1 to the gate terminal of the switching element 26-1. This allows the gate driver 29 to turn on and off the switching element 26-1 at timing specified by the control circuit 30. Similarly, the gate driver 29 turns on and off each of the switching elements 26-2 to 26-4 by changing a voltage applied to the gate terminal of the switching element.

The control circuit 30 includes, for example, nonvolatile and volatile memory circuits, an arithmetic circuit, and an interface circuit for connection to another circuit. The control circuit 30 receives a signal from an external device (not shown) for transmitting power either from the primary device 2 to the secondary device 3 or from the secondary device 3 to the primary device 2. The control circuit 30 controls the power supply rectifier circuit 25 in accordance with the signal.

More specifically, during power transmission from the primary device 2 to the secondary device 3, the control circuit 30 controls the on-off state of each switching element in the power supply rectifier circuit 25 to synchronously rectify AC power received through the resonant circuit 20. For example, similarly to the control circuit 17 operating during power transmission from the secondary device 3 to the primary device 2, the control circuit 30 may control the on-off state of the switching elements 26-1 to 26-4. More specifically, the voltage between the source and the drain of the switching element 26-4 detected by the voltage detection circuit 28-1 decreases to less than or equal to a predetermined reference value when a current starts flowing through a body diode in the switching element 26-4. This causes the control circuit 30 to output, to the gate driver 29, a control signal for turning on the switching elements 26-1 and 26-4. In response to the control signal, the gate driver 29 turns on the switching elements 26-1 and 26-4. When the voltage between the source and the drain of the switching element 26-4 detected by the voltage detection circuit 28-1 exceeds a predetermined reference value, the control circuit 30 outputs, to the gate driver 29, a control signal for turning off the switching elements 26-1 and 26-4. In response to the control signal, the gate driver 29 turns off the switching elements 26-1 and 26-4. Similarly, the voltage between the source and the drain of the switching element 26-2 detected by the voltage detection circuit 28-2 decreases to less than or equal to a predetermined reference value when a current starts flowing through a body diode in the switching element 26-2. This causes the control circuit 30 to output, to the gate driver 29, a control signal for turning on the switching elements 26-2 and 26-3. In response to the control signal, the gate driver 29 turns on the switching elements 26-2 and 26-3. When the voltage between the source and the drain of the switching element 26-2 detected by the voltage detection circuit 28-2 exceeds a predetermined reference value, the control circuit 30 outputs, to the gate driver 29, a control signal for turning off the switching elements 26-2 and 26-3. In response to the control signal, the gate driver 29 turns off the switching elements 26-2 and 26-3. This allows the power supply rectifier circuit 25 to perform synchronous rectification and reduce loss due to a current flowing through the power supply rectifier circuit 25.

During power transmission from the secondary device 3 to the primary device 2, the control circuit 30 controls the on-off state of each switching element in the power supply rectifier circuit 25 to supply AC power from the power supply rectifier circuit 25 to the resonant circuit 20 at a predetermined switching frequency.

As described above, the frequency response of the power transmission efficiency between the primary device 2 and the secondary device 3 varies depending on the degree of coupling between the transmitter coil 13 in the primary device 2 and the transmitter coil 21 in the secondary device 3. Thus, when the degree of coupling between the transmitter coil 13 and the transmitter coil 21 is substantially constant during power transmission, such as when the relative positions of the primary device 2 and the secondary device 3 are prefixed during power transmission, the control circuit 30 may output, to the gate driver 29, a control signal for alternately turning on and off the pair of the switching elements 26-1 and 26-4 and the pair of the switching elements 26-2 and 26-3 at a switching frequency at which the power transmission efficiency peaks at the degree of coupling.

As described above, the contactless power transmission apparatus with the SPL topology enables bidirectional power transmission. Additionally, the contactless power transmission apparatus includes a capacitor connected in series to a transmitter coil included in a parallel resonant circuit in the secondary device. This structure reduces the likelihood of biased excitation during power transmission from the secondary device to the primary device. The contactless power transmission apparatus can thus prevent failures caused by biased excitation and stably transmit power in both directions.

The capacitor 23 may be connected at a position different from the position described in the above embodiment. The capacitor 23 may be connected in series to the transmitter coil 21 included in the resonant circuit 20.

Figure 3:
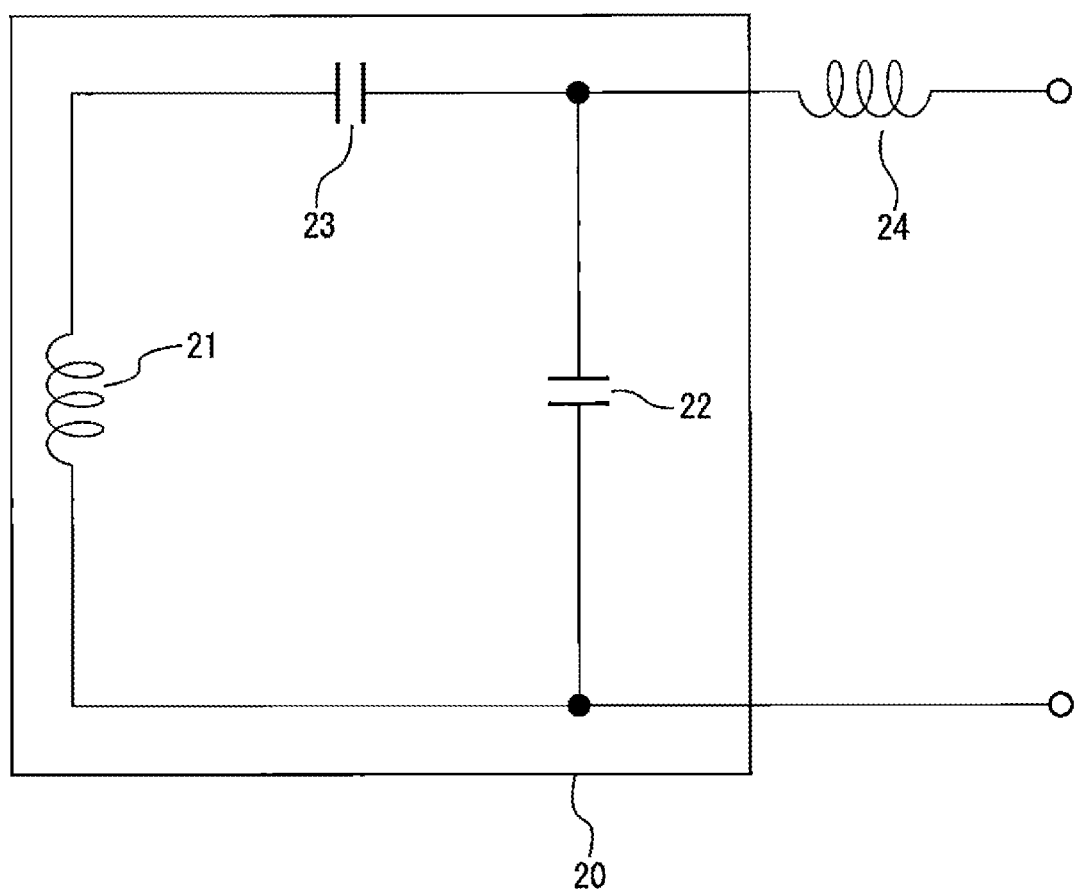
FIG. 3 is a diagram of a secondary device according to a modification showing the connection position of a capacitor for reducing biased excitation.

FIG. 3 is a diagram of a secondary device 3 according to a modification showing the connection position of a capacitor 23. For simplicity, a power supply rectifier circuit 25, voltage detection circuits 28-1 and 28-2, a gate driver 29, and a control circuit 30 are not shown in FIG. 3.

In this modification, the capacitor 23 is connected between one end of a transmitter coil 21 and one end of a resonant capacitor 22 in a resonant circuit 20. In this example as well, the capacitor 23 is connected in series to the transmitter coil 21 between the transmitter coil 21 and a coil 24.

Figure 4:
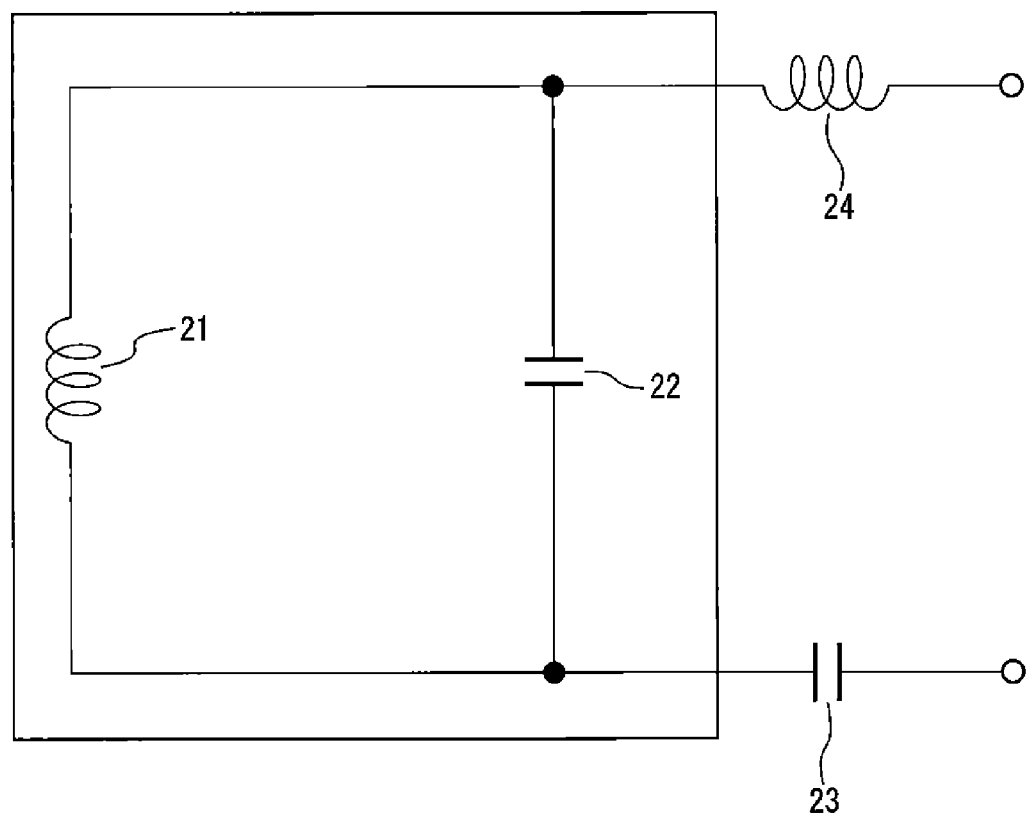
FIG. 4 is a diagram of a secondary device according to another modification showing the connection position of a capacitor for reducing biased excitation.

FIG. 4 is a diagram of a secondary device 3 according to another modification showing the connection position of a capacitor 23. For simplicity, a power supply rectifier circuit 25, voltage detection circuits 28-1 and 28-2, a gate driver 29, and a control circuit 30 are not shown in FIG. 4.

In this example, the capacitor 23 is connected to the other end of a transmitter coil 21 different from one end connected to a coil 24 and to the other end of a resonant capacitor 22 different from one end connected to the coil 24. The capacitor 23 is connected in series to the transmitter coil 21.

In any of the modifications in FIGS. 3 and 4, the secondary device 3 including the capacitor 23 reduces the likelihood of biased excitation during power transmission from the secondary device 3 to a primary device 2. In any of the modifications in FIGS. 3 and 4, during power transmission from the primary device 2 to the secondary device 3 or from the secondary device 3 to the primary device 2, the control performed by the control circuit 17 in the primary device 2 and the control circuit 30 in the secondary device 3 is performed in the same manner as the control circuits described in the above embodiment.

The relative positions of the primary device 2 and the secondary device 3 may be unfixed. In this case, the degree of coupling between the transmitter coil 13 in the primary device 2 and the transmitter coil 21 in the secondary device 3 may vary. In this case, the output voltage on the receiver end may be measured and a control circuit on the transmitter end may control a power supply rectifier circuit to adjust the switching frequency of AC power applied to a transmitter coil to increase the output voltage.

For example, the primary device 2 may include a voltage detection circuit that measures a voltage between the two input-output terminals of the power supply rectifier circuit 10 and a communicator for communicating with the secondary device 3. Similarly, the secondary device 3 may include a voltage detection circuit that measures a voltage between the two input-output terminals of the power supply rectifier circuit 25 and a communicator for communicating with the primary device 2. During power transmission from the primary device 2 to the secondary device 3, information about a measured voltage between the two input-output terminals in the power supply rectifier circuit 25 may be provided in fixed cycles from the secondary device 3 to the primary device 2 through the communicator. The control circuit 17 in the primary device 2 may then change the switching frequency for the power supply rectifier circuit 10 to have the measured voltage greater than or equal to a predetermined threshold or to maximize the voltage.

Similarly, during power transmission from the secondary device 3 to the primary device 2, information about a measured voltage between the two input-output terminals of the power supply rectifier circuit 10 may be provided in fixed cycles from the primary device 2 to the secondary device 3 through the communicator. The control circuit 30 in the secondary device 3 may then change the switching frequency for the power supply rectifier circuit 25 to have the measured voltage greater than or equal to a predetermined threshold or to maximize the voltage.

As described above, those skilled in the art can make various changes in accordance with embodiments implemented within the scope of the present invention.

The invention claimed is:

1. A contactless power transmission apparatus, comprising:
   a primary device; and
   a secondary device configured to transmit and receive electric power to and from the primary device, wherein the primary device comprises:
      a first transmitter coil configured to transmit and receive electric power to and from the secondary device;
      a first capacitor connected in series to the first transmitter coil; and
      a first converter circuit connected to the first transmitter coil through the capacitor to convert direct current power to alternating current power flowing through the first transmitter coil and convert alternating current power flowing through the first transmitter coil to direct current power,
   the secondary device comprises:
      a resonant circuit including a second transmitter coil configured to transmit and receive electric power to and from the primary device and a resonant capacitor connected in parallel to the second transmitter coil;
      a second converter circuit connected to the resonant circuit to convert alternating current power flowing through the resonant circuit to direct current power and convert direct current power to alternating current power flowing through the resonant circuit;
      a coil connected in series to the second transmitter coil between the resonant circuit and the second converter circuit; and
      a second capacitor connected in series to the second transmitter coil between the second transmitter coil and the second converter circuit such that one end of the second capacitor is connected directly to the second transmitter coil and another end of the second capacitor is connected directly to the coil, and
   the second capacitor has a capacitance at least ten times larger than a capacitance of the resonant capacitor, the value of the second capacitor selected so as to reduce biased excitation in a first power transmission from the secondary device to the primary device without reducing resonance in the resonant circuit during a second power transmission from the primary device to the secondary device.

* * * * *